(12) United States Patent
Ellingson

(10) Patent No.: US 7,160,601 B2
(45) Date of Patent: Jan. 9, 2007

(54) ENTRYWAY WITH DIMENSIONALLY STABLE PLASTIC COMPONENTS

(75) Inventor: Robert T. Ellingson, Social Circle, GA (US)

(73) Assignee: Reese Enterprises, Inc., Covington, GA (US)

( * ) Notice: Subject to any disclaimer, the term of this patent is extended or adjusted under 35 U.S.C. 154(b) by 449 days.

(21) Appl. No.: 10/273,009

(22) Filed: Oct. 17, 2002

(65) Prior Publication Data

US 2004/0076808 A1 Apr. 22, 2004

(51) Int. Cl.
*B32B 3/26* (2006.01)

(52) U.S. Cl. .................. 428/158; 428/172; 428/213; 52/582.1; 52/633; 52/638; 52/653.1; 52/726.1; 49/467; 49/504; 403/178; 403/402

(58) Field of Classification Search ............ 428/158, 428/172, 213; 52/582.1, 633, 638, 653.1, 52/726.1; 403/178, 402; 49/467, 504
See application file for complete search history.

(56) References Cited

U.S. PATENT DOCUMENTS

| | | | |
|---|---|---|---|
| 4,198,785 A * | 4/1980 | Marulic et al. ............ 49/304 |
| 4,440,825 A | 4/1984 | Paddock ............... 428/318.6 |
| 4,514,449 A | 4/1985 | Budich et al. ............. 428/76 |
| 4,610,900 A | 9/1986 | Nishibori .................. 428/15 |
| 4,910,067 A | 3/1990 | O'Neill .................... 428/139 |
| 5,133,912 A | 7/1992 | Hagiwara et al. .......... 264/46.4 |
| 5,194,308 A | 3/1993 | Chang ..................... 428/44 |
| 5,334,450 A | 8/1994 | Zabrocki et al. ............ 428/332 |
| 5,652,039 A | 7/1997 | Tremain et al. ............ 428/121 |
| 5,658,652 A | 8/1997 | Sellergren ................. 428/71 |
| 5,706,624 A * | 1/1998 | Lipson .................... 52/745.2 |
| 5,792,529 A | 8/1998 | May ....................... 428/36.2 |
| 5,948,524 A | 9/1999 | Seethamraju et al. ....... 428/326 |
| 6,066,680 A | 5/2000 | Cope ...................... 521/79 |
| 6,090,336 A | 7/2000 | Hirmer et al. ............. 264/511 |
| 6,136,441 A | 10/2000 | MacGregor et al. ......... 428/412 |
| 6,173,547 B1 * | 1/2001 | Lipson .................... 52/582.1 |
| 6,265,037 B1 | 7/2001 | Godavarti et al. .......... 428/34 |
| 6,367,201 B1 * | 4/2002 | Massey et al. ............. 49/467 |
| 6,394,864 B1 | 5/2002 | Scharl .................... 441/65 |

* cited by examiner

*Primary Examiner*—Merrick Dixon
(74) *Attorney, Agent, or Firm*—Womble Carlyle Sandridge & Rice

(57) ABSTRACT

A door jamb assembly for an entryway has a wooden jamb plate to which an extruded plastic brick mold and stop member is attached. The brick mold and stop member forms the raised stop of the jamb assembly also may form the brick mold thereof. The extruded plastic brick mold and stop member has a core made of economical cellular PVC plastic at least partially encased in a stabilizing layer of a plastic material, such as SAN, having a heat distortion temperature greater than that of the PVC plastic of the core. The stabilizing layer holds the core material in place and restrains it against distortion and shrinkage due to extreme temperatures, such as those found between a storm door and a door exposed to direct sunlight.

7 Claims, 2 Drawing Sheets

ENTRYWAY WITH DIMENSIONALLY STABLE PLASTIC COMPONENTS

TECHNICAL FIELD

This invention relates generally to building construction and more specifically to entryways and windows with components made of extruded plastic material.

BACKGROUND

For decades, entryway components including door jambs, brick mold, thresholds, and the like were made of wood because, among other reasons, wood is a dimensionally stable when exposed to extremes of temperature. That is, wood's coefficient of thermal expansion and contraction is extremely low. As a result, entryways made of wood can withstand even the most extreme temperature changes without warping due to expansion in hot temperatures and without exhibiting reversion (i.e. pulling away from adjacent structures) due to shrinkage in cold temperatures.

While wood entryway components indeed exhibit excellent dimensional stability when exposed to changes in temperature, wood also has inherent shortcomings that makes it less than optimal for fabrication of entryways. For instance, as wood supplies dwindle, wood becomes more and more expensive as a fabrication material, particularly in the high grades required for entryway systems. Perhaps more salient, however, is the fact that wood has a tendency to rot or otherwise deteriorate over time, particularly when exposed to moisture. This is particularly true for entryway components such as door jambs and brick mold because rain water tends to accumulate on the threshold at the bottoms of these components and seep into the end grain of the wood. The same is generally true for window frame components.

In recent years, many door and window manufacturers have attempted to develop door frame and window frame components fabricated from extruded plastic or plastic composites. Plastic offers advantages over wood because of its cost, durability, resistance to rot and decay, and other features. However, plastics, and particularly plastics such as PVC that are economically viable, have their own inherent shortcomings. For instance, most economically viable plastics that can be used to extrude door and window components have a heat distortion temperature (HDT) in the range of about 155° to 160° Fahrenheit. The significance of HDT is that once a plastic component is heated above this temperature, a change occurs in the molecular polymeric chains within the plastic. Specifically, the molecule chains tend to squeeze or bunch more closely together. The ultimate result is that when the temperature cools back below the HDT, the plastic component is permanently shortened, shrunk, or distorted. Obviously, such shrinkage is not tolerable in a door or window frame since it results in the distortion and gaps characteristic of reversion. In addition, plastics generally used for extruding door frame components have coefficients of thermal expansion that are significantly higher than wood. This can cause warping and buckling of a plastic door or window frame component in higher temperatures such as those commonly experienced in the South and Midwest.

Even with the forgoing shortcomings, extruded plastic door and window components made of economically viable plastics have proven themselves adequate for use in a significant number of applications in geographic regions where temperatures are moderate. In these applications, the temperature never rises high enough to cause warping due to thermal expansion and certainly does not rise above the HDT of the plastic, which can cause reversion in the plastic components. However, there is a significant number of applications and geographic regions where this is not the case. For example, when a glass storm door or storm window is installed on an entryway or window frame that is exposed to the sun, temperatures in the space between the storm door and entryway door can reach 185° Fahrenheit or higher, particularly where the entryway door is painted a dark heat absorbing color. Under these conditions, the thermal expansion of extruded plastic components made of PVC or other commonly used plastics causes these components to warp or bow. Further, since such temperatures are generally higher than the HDT of the plastic, reversion occurs in the plastic components, which results in distortion and the pulling away of the components from adjacent structures such as a threshold. Because of this, manufacturers of entryways with extruded plastic components warn against the use of storm doors with their entryways and often will not honor product warranties in the event of a storm door installation. Expansion induced warping and reversion also can be a problem in certain geographic regions such as in South Florida and the Midwest where temperatures in the summer can rise to over 110°. When extruded plastic door and window frame components are exposed to sun under these conditions, particularly if they are painted a dark color, warpage and reversion can occur.

Plastic materials do exist that have a higher HDT and a lower coefficient of thermal expansion than common plastics such as PVC. Such plastics include acrylonitrile-butadine-styrene (ABS), acrylonitrile-styrene-acrylate (ASA), and styrene-acrylonitrile (SAN) among others. The stability of such plastics can be increased even further by extruding them with a composite filler such as wood flour, ground rice hulls, or the like. Extruded door and window frame components made from such plastics or plastic composites indeed are very stable and can withstand temperature extremes with little or no warpage and reversion. Unfortunately, these plastics are dramatically more expensive than PVC and other common plastics, making door and window frames incorporating components made from them non-competitive in the marketplace.

Therefore, a need exists for an entryway (and a window for that matter) incorporating extruded plastic components that exhibit the dimensional and thermal stability of more expensive plastics and composites while at the same time being sufficiently economical so that the resulting products are competitive with existing wood and wood/plastic door and window frames. An entryway made with such components should remain dimensionally stable even when exposed to the very high temperatures generated when a storm door is installed and should withstand the extreme temperatures in particularly hot and cold regions of the country. It is to the provision of such an entryway and of dimensionally stable plastic components for use with entryways and windows that the present invention is primarily directed.

SUMMARY OF THE INVENTION

Briefly described, the present invention, in a preferred embodiment thereof, comprises an entryway having a pair of spaced vertical door jambs extending upwardly from a threshold assembly. A head jamb or header joins the top ends of the vertical jambs to define the opening of the entryway. A door is hingedly attached to one of the vertical jambs and can be hinged shut to close off the entryway in the usual way.

In the preferred embodiment, the vertical jambs and head jamb are fabricated from an elongated wooden jamb plate to which an extruded plastic brick mold and stop member is attached. Together, the wooden jamb plate and attached brick mold and stop member define the well known profile of door jamb. The extruded plastic brick mold and stop member has a leg that overlies a portion the inside face of the jamb plate and an edge that defines a raised stop extending along the jamb against which the door closes. The edge is extruded to define an elongated kerf sized to receive a standard weather strip. The entryway may be mounted in a roughed-in opening in an outside wall of a house or building in the usual way to define an entry door into the building.

The extruded plastic brick mold and stop member of the present invention is co-extruded in such a way that it has a blown or cellular core made of economical cellular PVC, cellular polystyrene, or similar plastic material. However, unlike the prior art, the member also has a non-cellular stabilizing layer of a predetermined thickness at least partially encasing the cellular core. The stabilizing layer is made of a dimensionally stable plastic material having a relatively high HDT and a relatively low coefficient of thermal expansion. Such materials include, for instance, ASA, SAN, and ABS. The stabilizing layer may contain a filler, such as wood flour to reduce its cost without affecting its thermal response characteristics. Finally, the member may have a third or wear layer covering the stabilizing layer. The wear layer may be made of non-cellular PVC plastic or, alternatively, may simply be a primer that is painted on the stabilizing layer.

The inventors have discovered that a brick mold and stop member coextruded with the forgoing configuration exhibits the HDT and coefficient of thermal expansion characteristics of the plastic material from which the stabilizing layer is extruded. In other words, the entire member behaves substantially as if it were extruded completely from the more expensive plastic of the stabilizing layer. It does not begin to exhibit heat distortion and the resulting reversion until exposed to temperatures higher than the HDT of the stabilizing layer, which can be over 200° Fahrenheit depending upon the plastic material selected. Further, the member exhibits thermal expansion substantially the same as that of the stabilizing layer rather than the much higher thermal expansion characteristics of the PVC plastic of the core. In essence, the stabilizing layer holds the cellular material of the core in place and, since the plastic of the stabilizing layer is stronger than the plastic of the core, it prevents the core from distorting, expanding, or shrinking, which it otherwise is apt to do. An entryway incorporating this dimensionally stable component has been demonstrated to be suitable for use with storm doors and in very hot environments where prior plastic door components have failed. However, since the bulk of the member is made of economical cellular PVC plastic, it can be made at a cost sufficiently low to be competitive with other entryway constructions in the marketplace.

Thus, an improved entryway is now provided that meets the need for an entryway with dimensionally stable extruded plastic components at an economically competitive cost. These and other features, objects, and advantages of the invention will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
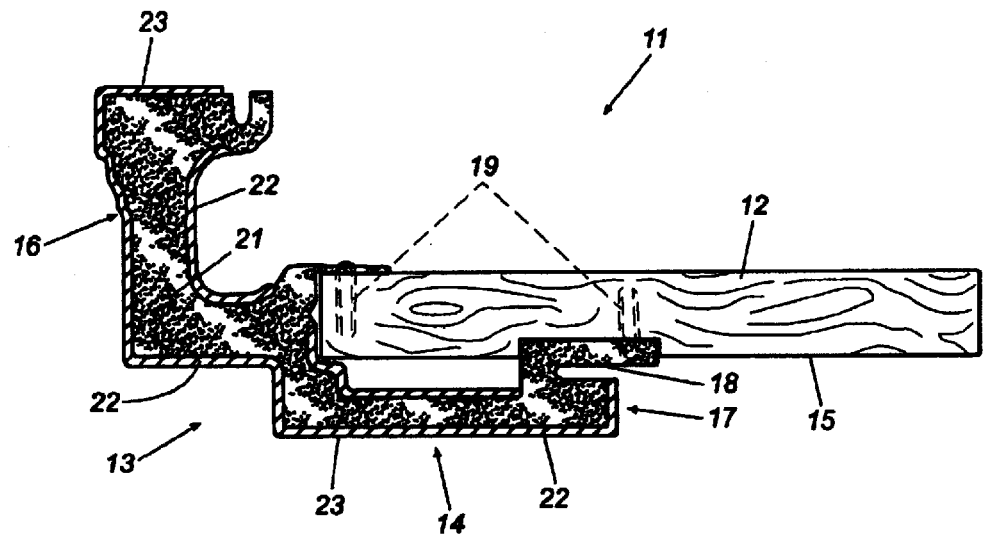
FIG. 1 is an end view, partially cross-sectioned, of a door jamb with a dimensionally stable extruded plastic brick mold and stop member that embodies principles of the present invention in a preferred form.

Referring now in more detail to the drawing figures, in which like reference numerals refer where appropriate to like parts throughout the several views, FIG. 1 illustrates, in cross-sectioned profile, a door jamb assembly that embodies principles of the present invention. The jamb assembly profile in the preferred embodiment is similar to the profile in my U.S. Pat. Nos. 5,634,303 and 5,901,510 the disclosures of which are hereby incorporated by reference. It should be understood, however, that the present invention is not limited to any particular profile or, for that matter, to a door jamb assembly at all. Other door jamb configurations (e.g. with or without brick mold portions) as well as window frames and jambs may incorporate the invention and all such profiles and components are contemplated to be within the scope of the invention. However, the door jamb assembly profile illustrated in the drawings is somewhat common and is selected for clarity of description and as a preferred mode of carrying out the invention.

The door jamb assembly 11 has an elongated wooden jamb plate 12 having an inside face 15. An extruded plastic brick mold and stop member 13 is attached to the jamb plate with appropriate fasteners such as staples 19 and extends along the outside edge portion of the jamb plate. In general, the plastic brick mold and stop member 13 is formed to define a leg 14 that overlies a portion of the inside face 15 of the jamb plate. The leg 14 has an edge 17 that forms a raised stop extending along the jamb member and against which a door closes. The leg 14 also is formed to define a kerf 18 that extends along the bottom of the raised stop for receiving and securing a length of weather stripping that extends along the stop and seals against a closed door. The brick mold and stop member 13 in the preferred embodiment is further formed to define a brick mold portion 16 that is profiled and positioned to simulate a traditional wooden brick mold in an all-wood jamb. While the brick mold is extruded unitarily with the stop member in the illustrated embodiment, it could just as well be added as a separate piece or left off altogether if desired.

According to one embodiment of the invention, the brick mold and stop member 13 is co-extruded by known extrusion techniques to have a blown or cellular core 21 made from an economical plastic material such as PVC extruded with a blowing agent. The cellular PVC core 21 is at least partially encased in a stabilizing layer 22, which preferably is made of a non-cellular dimensionally stable plastic material such as ASA, SAN, ABS, or another equivalent dimensionally stable material. The thickness of the stabilizing layer 22 may range from about 0.010 inch to about 0.200 inch and preferably falls between about 0.020 inch and 0.040 inch. Further, the plastic of the stabilizing layer 22 may be mixed with any appropriate filler such as wood flour, ground rice hulls, or another filler to form a composite plastic layer that is less expensive but still dimensionally stable. The amount of filler may fall within a range from about 5% to about 60% by volume and more preferably within a range from about 10% to about 20% by volume.

This percentage of filler to plastic also may change depending upon the type filler and the type plastic chosen for the stabilizing layer.

The extruded brick mold and stop member 13 preferably, but not necessarily, includes a third or wear layer 23 that covers the stabilizing layer 22. The wear layer 23 may be formed of a plastic material such as PVC that is coextruded with the stabilizing layer, or it may simply be a painted-on or sprayed on layer of a primer or another appropriate material, depending upon the intended application of the jamb. Alternatively, the brick mold and stop member may be formed with no wear layer at all, in which case the stabilizing layer itself forms the outer surface of the member.

Figure 2:
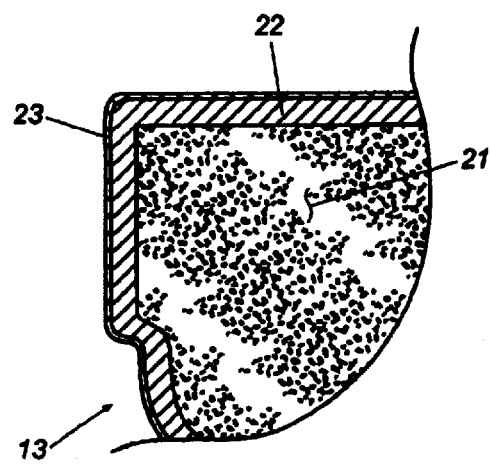
FIG. 2 is an enlarged view of a section of the brick mold and stop member of FIG. 1 illustrating the core, stabilizing layer, and wear layer thereof.

FIG. 2 is a blow-up of a section of the brick mold and stop member 13 of FIG. 1 showing more clearly the cellular PVC core 21 covered by the non-cellular dimensionally stable stabilizing layer 22 and the wear layer 23. With regard to the wear layer, entryway components with a cellular PVC core covered by a non-cellular PVC wear layer are available. One problem with such components is that the wear layer is easily scratched or dented because of the lack of resiliency of the underlying cellular PVC material. The inventors have discovered, however, that an unexpected advantage of the configuration of the present invention is that a wear layer made of non-cellular PVC covering a stabilizing layer of SAN or similar plastic is much less prone to being scratched and dented. This is because the plastic or plastic composite of the stabilizing layer is much harder and more resilient than the cellular PVC core and provides a harder and more robust foundation for the PVC wear layer. In any event, the enhanced durability of the wear layer is an unexpected benefit of the present invention and thus deserving of mention.

Figure 3:
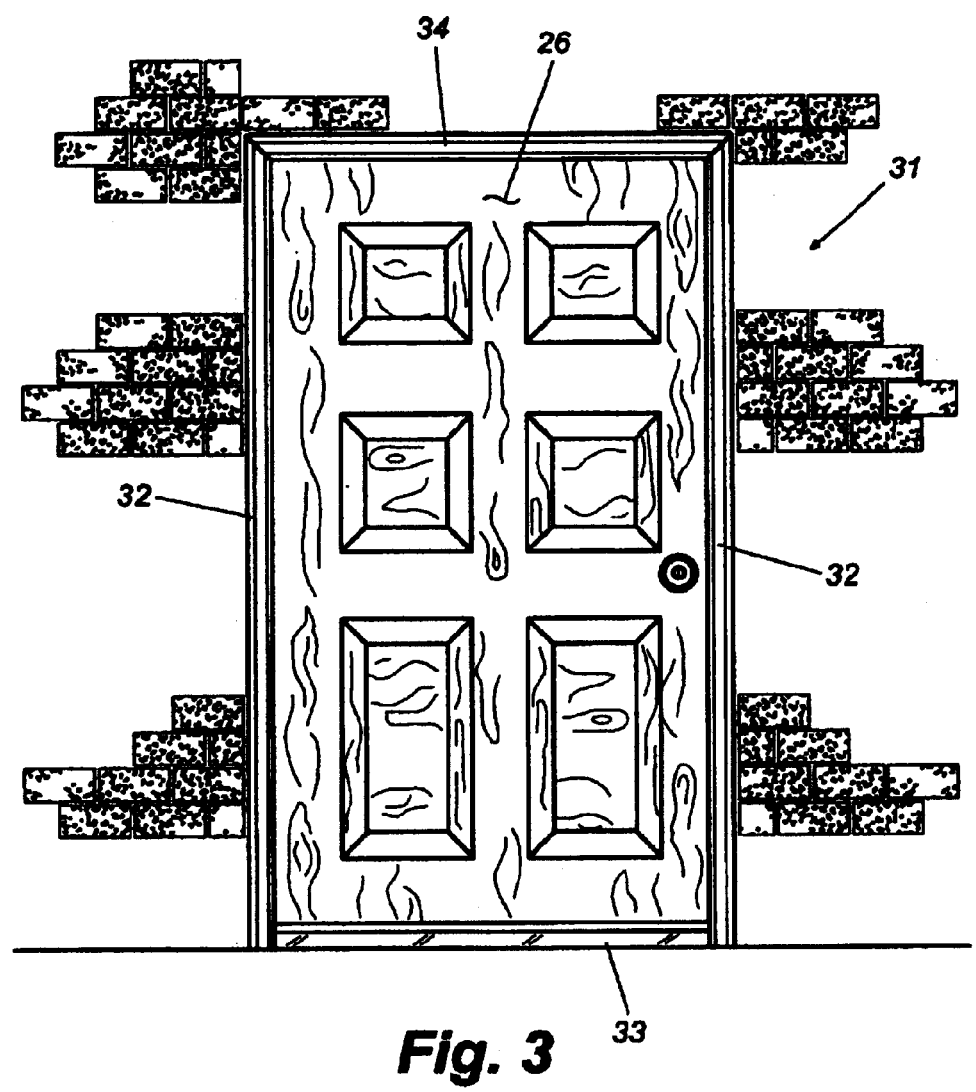
FIG. 3 is a plan view of an entryway that incorporates principles of the present invention.

FIG. 3 illustrates an entryway that incorporated the present invention. The entryway 31 includes a pair of spaced vertical jamb assemblies 32, which incorporate the features of the invention as described above. The vertical jamb assemblies 32 extend upwardly from the ends of a threshold 33 and a head jamb 34, which also incorporates principles of the invention, spans the top ends of the vertical jambs to complete and frame the opening of the entryway. A door 36 is hingedly attached to one of the jamb assemblies 32 and can be hinged shut, as shown, to close off the entryway in the traditional way.

EXAMPLE

The present invention has been tested in a variety of ways as described below to verify that the extruded plastic components of the entryway indeed exhibit dimensional stability when exposed to extremes of temperature while simultaneously being sufficiently economical to compete in the marketplace. First, specimens of the invention with various thickness and compositions of stabilizing layers and with various or no wear layers were subjected to heating and cooling cycles in an oven and a freezer. Prior art all-PVC components were also subjected to the tests as control samples. In the test, samples were heated in the oven to a temperature of about 178°–180° Fahrenheit (above the HDT of PVC) for a period of about 2 hours. The specimen was then taken out of the oven and allowed to normalize to room temperature for about 2 hours, whereupon the specimen was placed in a freezer and left overnight at temperatures below 32° Fahrenheit. The cycle was repeated five to six times and the reversion and heat distortion effects of each specimen observed and graded. The tests produced the following results.

| SPCMN | DESCRIPTION | STABILIZING LAYER | WEAR LAYER | RESULTS |
|---|---|---|---|---|
| 1 (cntrl) | Prior art cellular PVC core with non-cellular PVC skin | None | Non-cellular PVC | Reversion about 1 inch. Heat distortion very prominent. |
| 2 (cntrl) | Prior art cellular PVC core with non-cellular PVC skin | None | Non-cellular PVC | Reversion about 1 inch or more. Heat distortion very prominent. |
| 3 | Cellular SAN core with 10% wood flour filler and non-cellular PVC skin | None | Non-cellular PVC | Reversion and heat distortion almost non-existent. Works, but is too expensive. |
| 4 | Cellular PVC core with non-cellular SAN stabilizing layer. | Non-cellular SAN .020 inch thick with 10% wood flour filler | None | Reversion still unacceptable, but heat distortion significantly improved. |
| 5 | Cellular PVC core with non-cellular SAN stabilizing layer. | Non-cellular SAN .030 inch thick with 10% wood flour filler | None | Improved reversion and heat distortion |
| 6 | Cellular PVC core with non-cellular SAN stabilizing layer | Non-cellular SAN .040 inch thick with 10% wood flour filler | None | Further improved reversion and heat distortion |

-continued

| SPCMN | DESCRIPTION | STABILIZING LAYER | WEAR LAYER | RESULTS |
|---|---|---|---|---|
| 7 | Cellular PVC core with non-cellular SAN stabilizing layer | Non-cellular SAN .050 inch thick with 10% wood flour filler | None | Still further improved reversion and heat distortion |
| 8 | Cellular PVC core with non-cellular SAN composite stabilizing layer | Non-cellular SAN .060 inch thick with 20% wood flour filler | None | Acceptable reversion and acceptable heat distortion |
| 9 | Cellular PVC core with non-cellular SAN composite stabilizing layer and PVC wear layer | Non-cellular SAN .020 inch thick with 10% wood flour filler | Non-cellular PVC | Significantly improved reversion and heat distortion compared to controls |
| 10 | Cellular PVC core with non-cellular SAN composite stabilizing layer and PVC wear layer | Non-cellular SAN .040 inch thick with 10% wood flour filler | Non-cellular PVC | Acceptable reversion and acceptable heat distortion of less than 20 percent that of controls |

Accordingly, these tests indicate that a door jamb assembly with a coextruded plastic stop member made with a cellular PVC core and a non-cellular SAN stabilizing layer of appropriate thickness solves the problems of reversion and heat distortion experienced with prior art jamb assemblies incorporating all-PVC plastic components. This is true even when the specimens are exposed to temperature changes far more severe than those experienced in the real world including in situations where storm doors are mounted to an entryway. Furthermore, these tests exposed unattached jamb assemblies to the full heat and cold of the tests, which saturated the assemblies with heat and cold. Such harsh conditions do not occur in the real world because the jambs are attached to buildings where adjacent framing structures, brick, stucco, and inside temperatures typically do not allow full saturation of the components with heat and cold. Accordingly, the oven/freezer tests above are believed to be much more stringent than conditions encountered in the real world.

In order to gauge the performance of the present invention in real world applications, entryways were made with jambs fabricated according to the present invention, hung with dark painted doors, and provided with glass storm doors. These entryways were then placed outdoors facing south to insure full exposure to sun and monitored for several months. Temperatures within the space between the storm door and closed door were monitored and were noted to rise as high as 185° Fahrenheit in the mid-day sun. After several months of exposure, any heat distortion and reversion was noted.

Not surprisingly, the control sample with a prior art cellular PVC core covered by a non-cellular PVC skin exhibited bowing by as much as ⅛ inch or more due to heat distortion and also exhibited significant pulling away from the threshold due to reversion. However, the specimen incorporating a brick mold and stop member fabricated according to the present invention with a cellular PVC core covered by a 0.030 inch thick stabilizing layer of non-cellular SAN composite with 20% wood filler exhibited no measurable heat distortion or reversion effects after several months. The stabilizing layer indeed stops heat distortion and reversion effects even when exposed to the extreme heat generated by a storm door. However, since the bulk of the plastic components are economical PVC, entryways incorporating the present invention remain economically viable in the market place.

The invention has been described herein in terms of preferred embodiments and methodologies. It will be clear to those of skill in the art, however, that various additions, deletions, and modifications to the illustrated embodiments might be made within the scope of the invention. For instance, while PVC has been cited as the preferred economical plastic for the cellular core of the invention, other plastics may be substituted with like results. Similarly, plastics other than SAN, ASA, and ABS might be used for the stabilizing layer so long as these plastics exhibit the appropriate HDT and coefficient of thermal expansion and are sufficiently strong to restrain the tendency of the PVC core to expand and revert. These and other modifications might be made to the illustrated embodiments without departing from the spirit and scope of the invention as set forth in the claims.

What is claimed is:

1. An entryway comprising:

a threshold;

a pair of spaced apart jamb assemblies extending upwardly from said threshold, each jamb assembly having at least one extruded plastic component;

a head jamb spanning the tops of said jambs; and a door hingedly mounted in said entryway for selectively opening and closing said entryway;

said at least one extruded plastic component being formed with a core of first plastic material having a first heat distortion temperature and a stabilizing layer at least partially encasing said core and being formed with a second plastic material having a second heat distortion temperature higher than said first heat distortion temperature, said stabilizing layer restraining said core against temperature induced deformation.

2. The entryway of claim 1 and wherein said core is formed of cellular PVC plastic material.

3. The entryway of claim 2 and wherein said stabilizing layer is formed of a plastic material chosen from the group consisting of SAN, ASA, and ABS plastic.

4. The entryway of claim 3 and wherein said stabilizing layer has a thickness between about 0.010 inches and about 0.200 inches.

5. The entryway of claim 4 and wherein said plastic material of said stabilizing layer is non-cellular.

6. The entryway of claim 1 and further comprising a wear layer co-extruded with and overlying said stabilizing layer.

7. The entryway of claim 6 and wherein said core is formed of cellular PVC plastic, said stabilizing layer is a non-cellular plastic selected from the group consisting of ASA, SAN, and ABS plastic, and said wear layer is non-cellular PVC plastic.

* * * * *